United States Patent [19]

Dorenbosch et al.

[11] Patent Number: 6,070,072

[45] Date of Patent: *May 30, 2000

[54] METHOD AND APPARATUS FOR INTELLIGENTLY GENERATING AN ERROR REPORT IN A RADIO COMMUNICATION SYSTEM

[75] Inventors: Jheroen Pieter Dorenbosch, Paradise; Kimberly Ann Goldinger, Fort Worth, both of Tex.

[73] Assignee: Motorola, Inc., Schaumburg, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 08/895,192

[22] Filed: Jul. 16, 1997

[51] Int. Cl.[7] .................................................. H04M 3/00
[52] U.S. Cl. .................... 455/423; 379/88.06; 379/88.19
[58] Field of Search .................................... 455/423, 424, 455/425; 379/201, 213, 88.05, 88.06, 88.19, 88.2, 27, 28, 32

[56] References Cited

U.S. PATENT DOCUMENTS

| | | | |
|---|---|---|---|
| 4,875,038 | 10/1989 | Siwiak et al. | 455/31.3 |
| 4,922,519 | 5/1990 | Daudelin | 379/88.01 |
| 5,189,692 | 2/1993 | Ferrara | 379/213 |
| 5,440,615 | 8/1995 | Caccuro et al. | 379/213 |
| 5,469,491 | 11/1995 | Morley, Jr. et al. | 379/88.13 |
| 5,485,507 | 1/1996 | Brown et al. | 379/88.06 |
| 5,502,761 | 3/1996 | Duncan et al. | 379/142 |
| 5,524,137 | 6/1996 | Rhee | 379/88.06 |
| 5,737,396 | 4/1998 | Garcia | 379/88.16 |
| 5,778,323 | 7/1998 | Dorenbosch et al. | 455/561 |
| 5,841,852 | 11/1998 | He | 379/201 |
| 5,848,131 | 12/1998 | Shaffer et al. | 379/201 |
| 5,878,113 | 3/1999 | Bhusri | 379/13 |
| 5,946,376 | 8/1999 | Cistulli | 379/88.06 |

*Primary Examiner*—Richemond Dorvil
*Assistant Examiner*—Martin Lerner
*Attorney, Agent, or Firm*—R. Louis Breeden

[57] ABSTRACT

A processing system (210) in a fixed portion of a radio messaging system stores (302, 304) at least one of (a) a list of preferred error report formats corresponding to users of portable subscriber units (122), and (b) a record of error report formats that are likely to be preferred by message originators, a selection of a preferred format being dependent upon information available about the message originator. The processing system selects (404, 408, 412, 416) at least one format from at least one of the list and the record, based upon at least one of (c) knowledge about the error, and (d) knowledge about at least one of (e) the user, and (f) the message originator. In addition, the processing system controls a transmitter (206) to transmit (418) the at least one error report to at least one of the portable subscriber unit and the message originator in the at least one format selected.

16 Claims, 3 Drawing Sheets

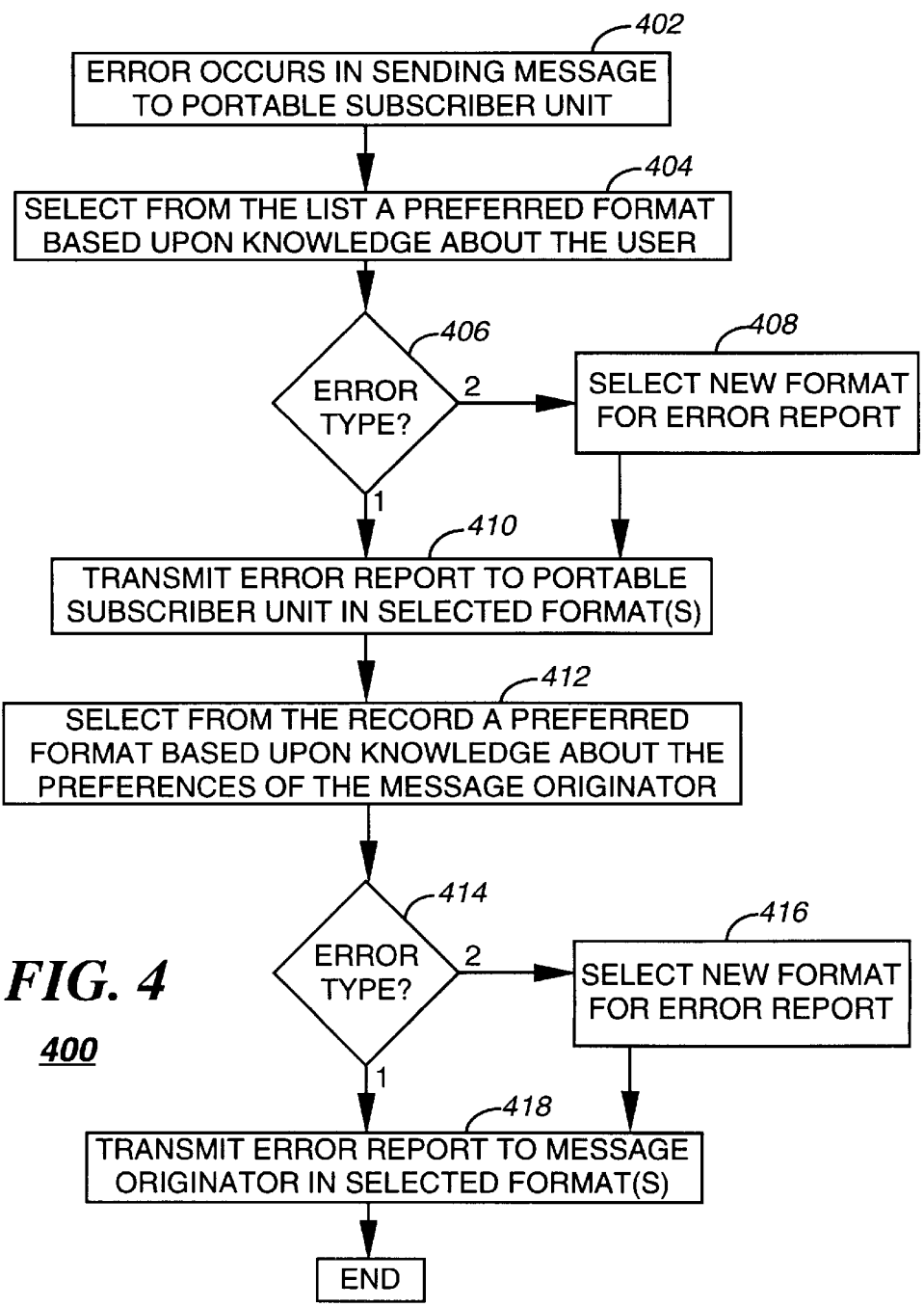

METHOD AND APPARATUS FOR INTELLIGENTLY GENERATING AN ERROR REPORT IN A RADIO COMMUNICATION SYSTEM

FIELD OF THE INVENTION

This invention relates in general to radio communication systems, and more specifically to a method and apparatus for intelligently generating an error report in a radio communication system.

BACKGROUND OF THE INVENTION

Two-way radio messaging systems are becoming increasingly popular. Such systems can encounter various error conditions that are difficult to deal with in a generic manner. For example, when a two-way voice pager runs out of memory during delivery of a voice message, an indicator in the pager is set to advise the user to delete old messages in order to make more memory space available. When the user deletes one or more old messages, the pager then informs the system (via the inbound channel) that more memory space is available. The system then sends the remainder of the message (or, alternatively, resends the entire message). This procedure does not work, however, when the message is so long that it still requires more memory than exists in the pager after the user has deleted the one or more old messages.

To cite another example, a data pager rented in China probably will receive system error reports in Chinese, but the user may be an American traveler who does not read Chinese and thus will not understand the error report.

These and other error reporting problems need to be handled in a more flexible, user-friendly manner. What is needed is a method and apparatus for intelligently generating an error report in a radio communication system.

SUMMARY OF THE INVENTION

An aspect of the present invention is a method of intelligently generating at least one error report in response to an error that can occur while sending a message from a message originator to a user of a portable subscriber unit. The method comprises in a fixed portion of the radio messaging system the step of storing at least one of (a) a list of preferred error report formats corresponding to users of portable subscriber units, and (b) a record of error report formats that are likely to be preferred by message originators, a selection of a preferred format dependent upon information available about the message originator. The method further comprises the step of selecting at least one format from at least one of the list and the record, based upon at least one of (c) knowledge about the error, and (d) knowledge about at least one of (e) the user, and (f) the message originator. In addition, the method comprises the step of transmitting the at least one error report to at least one of the portable subscriber unit and the message originator in the at least one format selected.

Another aspect of the present invention is a controller in a fixed portion of a radio messaging system for intelligently generating at least one error report in response to an error that can occur while sending a message from a message originator to a user of a portable subscriber unit. The controller comprises a network interface for receiving the message, and a processing system coupled to the network interface for processing the message. The controller further comprises an output interface coupled to the processing system for outputting the message. The processing system is programmed to store at least one of (a) a list of preferred error report formats corresponding to users of portable subscriber units, and (b) a record of error report formats that are likely to be preferred by message originators, a selection of a preferred format dependent upon information available about the message originator. The processing system is further programmed to select at least one format from at least one of the list and the record, based upon at least one of (c) knowledge about the error, and (d) knowledge about at least one of (e) the user, and (f) the message originator. The processing system is also programmed to transmit the at least one error report to at least one of the portable subscriber unit and the message originator in the at least one format selected.

BRIEF DESCRIPTION OF THE DRAWINGS

FIG. 3 is a flow chart depicting a storage operation of the radio messaging system in accordance with the present invention.

FIG. 4 is a flow chart depicting a selecting and transmitting operation of the radio messaging system in accordance with the present invention.

DETAILED DESCRIPTION OF THE DRAWINGS

Figure 1:
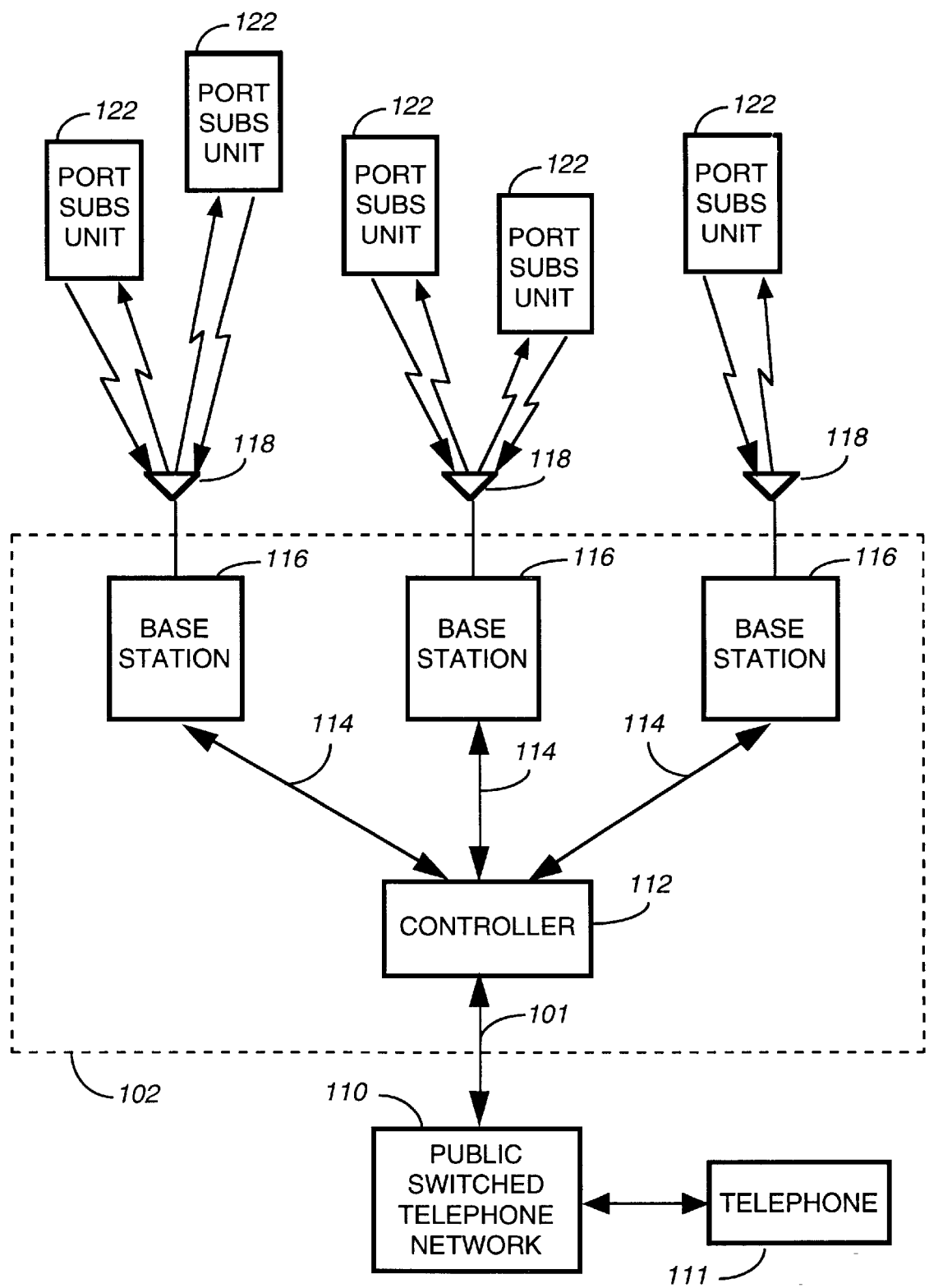
FIG. 1 is an electrical block diagram of a radio messaging system in accordance with the present invention.

Referring to FIG. 1, an electrical block diagram of a radio messaging system in accordance with the present invention comprises a fixed portion 102 including a controller 112 and a plurality of base stations 116, and a portable portion including a plurality of portable subscriber units 122, preferably having acknowledge-back capability. The base stations 116 are used for communicating with the portable subscriber units 122 utilizing conventional radio frequency (RF) techniques, and are coupled by communication links 114 to the controller 112, which controls the base stations 116.

The hardware of the controller 112 is preferably a combination of the Wireless Messaging Gateway (WMG™) Administrator! paging terminal, and the RF-Conductor!™ message distributor manufactured by Motorola, Inc. The hardware of the base stations 116 is preferably a combination of the Nucleus® Orchestra! transmitter and RF-Audience!™ receivers manufactured by Motorola, Inc. The portable subscriber units 122 are preferably conventional Tenor™ voice messaging units and Pagefinder™ data messaging units, also manufactured by Motorola, Inc. It will be appreciated that other similar hardware can be utilized as well for the controller 112, the base stations 116, and the portable subscriber units 122.

Each of the base stations 116 transmits RF signals to the portable subscriber units 122 via a transceiver antenna 118. The base stations 116 each receive RF signals from the plurality of portable subscriber units 122 via the transceiver antenna 118. The RF signals transmitted by the base stations 116 to the portable subscriber units 122 (outbound messages) comprise selective call addresses identifying the portable subscriber units 122, and voice and data messages originated by a caller, as well as commands originated by the controller 112 for adjusting operating parameters of the radio communication system. The RF signals transmitted by the portable subscriber units 122 to the base stations 116 (inbound messages) comprise responses that include scheduled messages, such as positive acknowledgments (ACKs) and negative acknowledgments (NAKs), and unscheduled messages, such as registration requests. An embodiment of an acknowledge-back messaging system is described in U.S. Pat. No. 4,875,038 issued Oct. 17, 1989 to Siwiak et al., which is hereby incorporated herein by reference. It will be appreciated that, with some limitations, the claimed invention can be applied to a one-way radio messaging system as well.

The controller 112 preferably is coupled by telephone links 101 to a public switched telephone network (PSTN) 110 for receiving selective call message originations therefrom. Selective call originations comprising voice and data messages from the PSTN 110 can be generated, for example, from a conventional telephone 111 coupled to the PSTN 110. It will be appreciated that, alternatively, other types of communication networks, e.g., packet switched networks and local area networks, can be utilized as well for transporting originated messages to the controller 112.

The protocol utilized for outbound and inbound messages is preferably selected from Motorola's well-known FLEX™ family of digital selective call signaling protocols. These protocols utilize well-known error detection and error correction techniques and are therefore tolerant to bit errors occurring during transmission, provided that the bit errors are not too numerous in any one code word. It will be appreciated that other suitable protocols can be used as well.

Figure 2:
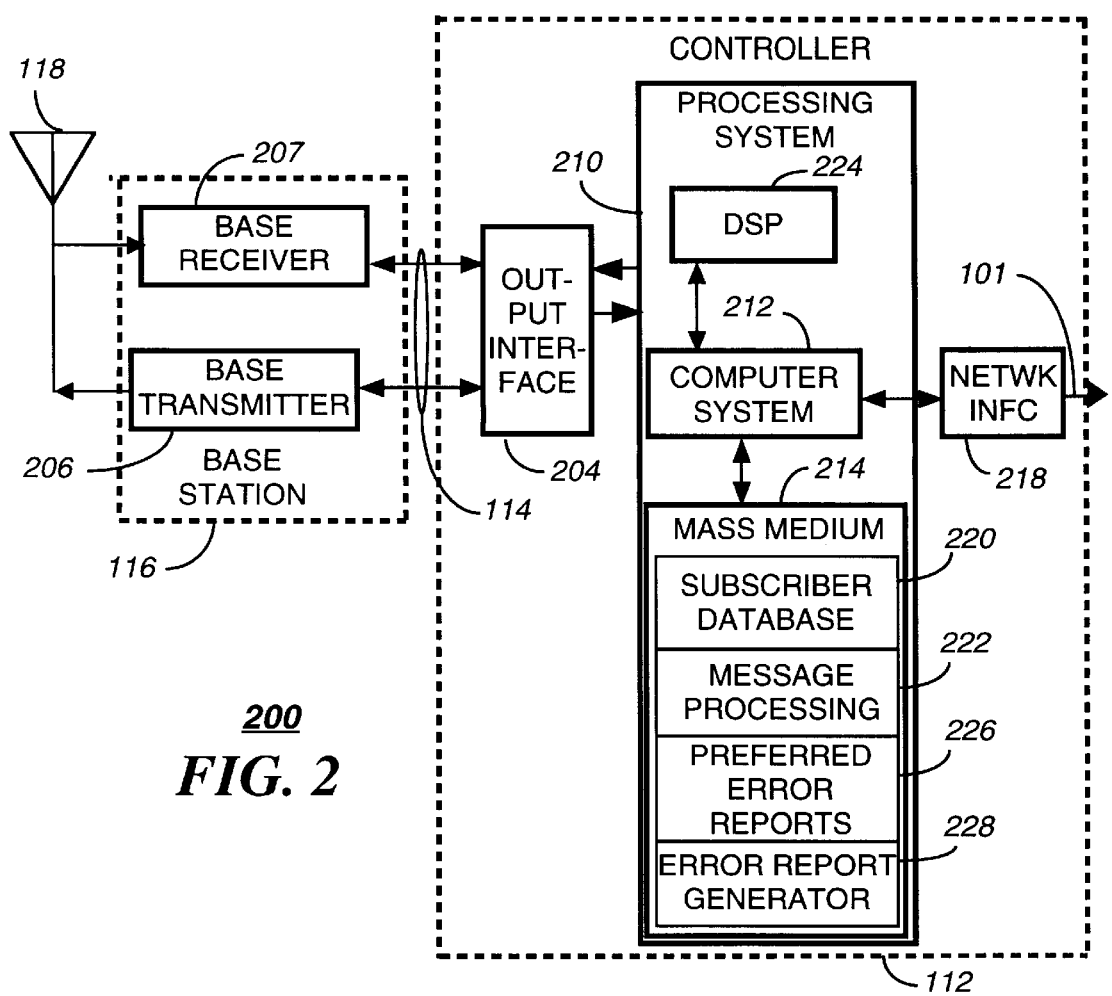
FIG. 2 is a simplified electrical block diagram of a fixed portion of the radio messaging system in accordance with the present invention.

FIG. 2 is a simplified electrical block diagram 200 of portions of the controller 112 and the base station 116 in accordance with the present invention. The controller 112 includes a processing system 210, a conventional output interface 204, and a conventional network interface 218. The base station 116 includes a base transmitter 206 and at least one base receiver 207. At least a portion of the processing performed on voice messages, as well as generation of synthesized voice responses, preferably is implemented in at least one conventional digital signal processor (DSP) 224 utilizing well-known techniques.

The processing system 210 is used for directing operations of the controller 112. The processing system 210 preferably is coupled through the output interface 204 to the base transmitter 206 via the communication link 114. The processing system 210 preferably also is coupled through the output interface 204 to the base receiver 207 via the communication link 114. The communication link 114 utilizes, for example, conventional means such as a direct wire line (telephone) link, a data communication link, or any number of radio frequency links, such as a radio frequency (RF) transceiver link, a microwave transceiver link, or a satellite link, just to mention a few. The processing system 210 is also coupled to the network interface 218 for accepting outbound voice and data messages originated by callers communicating via the PSTN 110 through the telephone links 101.

In order to perform the functions necessary for controlling operations of the controller 112 and the base stations 116, the processing system 210 preferably includes a conventional computer system 212, and a conventional mass storage medium 214. The conventional mass storage medium 214 includes, for example, a subscriber database 220, comprising subscriber information such as addressing and programming options of the portable subscriber units 122.

The conventional computer system 212 is preferably programmed by way of software included in the conventional mass storage medium 214 for performing the operations and features required in accordance with the present invention. The conventional computer system 212 preferably comprises a plurality of processors such as VME Sparc™ processors manufactured by Sun Microsystems, Inc. These processors include memory such as dynamic random access memory (DRAM), which serves as a temporary memory storage device for program execution, and scratch pad processing such as, for example, storing and queuing messages originated by callers using the PSIN 110, processing acknowledgments received from the portable subscriber units 122, and protocol processing of messages destined for the portable subscriber units 122. The conventional mass storage medium 214 is preferably a conventional hard disk mass storage device.

It will be appreciated that other types of conventional computer systems 212 can be utilized, and that additional computer systems 212, DSPs 224 and mass storage media 214 of the same or alternative type can be added as required to handle the processing requirements of the processing system 210. It will be further appreciated that additional base receivers 207 either remote from or collocated with the base transmitter 206 can be utilized to achieve a desired inbound sensitivity, and that additional, separate antennas 118 can be utilized for the base transmitter 206 and the base receivers 207.

The mass medium 214 preferably includes software and various databases utilized in accordance with the present invention. A message processing element 222 is included for processing the voice and data messages. In particular, the mass medium 214 also includes a preferred error reports database 226 and an error report generator 228, which program the processing system 210 to perform in accordance with the present invention, as is described further below. It will be appreciated that the controller 112 and the base station 116 can be either collocated or remote from one another, depending upon system size and architecture. It will be further appreciated that in large systems, functional elements of the controller 112 can be distributed among a plurality of networked controllers.

FIG. 3 is a flow chart 300 depicting a storage operation of the radio messaging system in accordance with the present invention. The flow begins with the processing system 210 storing 302 a list of preferred error report formats corresponding to users of the portable subscriber units 122. Here the word "format" is broadly defined to include content of the error report as well as how the error report is delivered (e.g., by voice, or by displayed characters, icons, or numbers.) This list preferably is generated and maintained through one or more conventional keyboard/display devices (not shown) on an on-going basis as new users are added to the radio messaging system. For each portable subscriber unit 122 the user's preferences regarding error report formats are recorded. Preferences can include, for example, the language to be used for error reports, whether the reports should be in a brief or verbose format, whether the reports should be in voice or in a specific display format, and, if in voice, what type of voice (e.g., male, female, Bugs Bunny, the user's own voice, etc.). Preferably, the user can specify format preferences applicable separately to error reports delivered to the user via the portable subscriber unit 122 and to error reports delivered to the message originator. For example, the user can specify that error reports delivered to the user via the portable subscriber unit 122 will be in a synthesized female voice, while error reports delivered to the message originator via the telephone network will be in the user's own voice.

In addition, the processing system 210 stores 304, in a similar fashion, a record of error report formats likely to be preferred by message originators. This record can include, for example, a list of country codes from which message originators are expected to place calls. For each country code, a language to be used for the error reports is specified. Thus, for example, if a message originator is calling from France (as determined from an Automatic Number Identification signal), then all error reports for that message originator will be in French. It will be appreciated that, alternatively, the processing system 210 can store and process only one of (a) the list of preferred error report formats corresponding to users of portable subscriber units, and (b) the record of error report formats likely to be preferred by message originators. That is, the processing system 210 can handle (a) and not (b), (b) and not (a), or both (a) and (b), as described herein below for the preferred embodiment.

FIG. 4 is a flow chart depicting an exemplary selecting and transmitting operation of the radio messaging system in accordance with the present invention. The flow starts when an error occurs 402 in sending a message to the portable subscriber unit 122. In response to a report of the error, the processing system 210 selects 404 from the list of preferred error formats corresponding to the users of the portable subscriber units 122, based upon knowledge about the user, e.g., knowledge of the selective call address of the portable subscriber unit 122 reporting the error. The processing system 210 then checks 406 the error type. There could be, for example, two types of error, a type 2 error requiring a format change, and a type 1 message not requiring a format change. If the error is a type 2 error, the processing system 210 selects 408 a new format (stored on the mass medium 214) for the error report. This feature can be used, for example, to augment an error report which is conveyed by the pager in a format that is deemed to be subject to misinterpretation by the user. By selecting a new format (e.g., a new message content), the system advantageously can clarify the error report. Next, the processing system 210 transmits 410 the error report to the portable subscriber unit 122, utilizing the selected format(s), e.g., an augmented error report in English voice, spoken by a female.

The processing system 210 then selects 412 an error report format from the record of error report formats likely to be preferred by message originators, based upon knowledge about the message originator, e.g., the country code from which the message originator is calling. Again, the processing system 210 checks 414 the error type. If the error type requires a format change, the processing system 210 selects 416 a new format. Additional error record formats for the message originator can be determined from the list of preferred error formats corresponding to the user. Next, the processing system 210 transmits 418 the error report to the message originator in the selected format(s), e.g., an error report corresponding to the reported error in French language, using a brief format, spoken in the user's voice.

One additional feature in accordance with the present invention aids the user of the portable subscriber unit 122 when the portable subscriber unit 122 requires service. In response to an error report from the portable subscriber unit 122 indicating a need for service, the processing system 210 formats an error report which is then transmitted back to the portable subscriber unit 122. The error report includes a list of service locations known to be near the last determined location of the portable subscriber unit 122. (The portable subscriber unit 122 is located by the processing system 210 using well-known techniques, e.g., by having the portable subscriber unit 122 report a color code transmitted by a nearby transmitter.)

Thus, it should be clear from the preceding disclosure that the present invention provides a method and apparatus in a radio messaging system that advantageously handles error reporting problems in a more flexible, user-friendly manner than available in the prior art. Formats of the error reports are selected according to the preferences of the user of the portable subscriber unit and the anticipated preferences of the message originator.

Many modifications and variations of the present invention are possible in light of the above teachings. Thus, it is to be understood that, within the scope of the appended claims, the invention may be practiced other than as described herein above.

What is claimed is:

1. A method of intelligently generating an error report, comprising in a fixed portion of a radio messaging system the steps of:

storing a list of preferred formats corresponding to users of portable subscriber units;

encountering an error that occurs while a message originator attempts to send a message to a message recipient selected from one of said users;

selecting, in response to said error, one of said preferred formats from said list, based upon knowledge about said error and said message recipient; and transmitting said error report to said message recipient in said one of said preferred formats.

2. The method of claim 1, wherein the transmitting step comprises the step of transmitting said error report such that said error report is different from another error report originally conveyed by one of said portable subscriber units to said message recipient in response to the error.

3. The method of claim 1, wherein the transmitting step comprises the step of transmitting to said message recipient said error report such that said error report contains service locations proximate said message recipient, in response to the error resulting from an indication from said message recipient that service is needed.

4. The method of claim 1, wherein the selecting step comprises the step of choosing a format defining how said error report is delivered, said format selected from a group of formats consisting of a voice format and a displayed image format that can include any of characters, icons, and numbers.

5. The method of claim 1, wherein the selecting step comprises the step of choosing a format defining a content of said error report, said format selected from a group of formats consisting of a brief report and a verbose report.

6. The method of claim 1, wherein the selecting step comprises the step of choosing a format defining how said error report is delivered, said format selected from a group of formats consisting of a voice message recorded by the user and a selection of voice messages recorded by others.

7. The method of claim 1, further comprising the steps of:

storing a plurality of message originator formats corresponding to the users of the portable subscriber units, and choosing one of said plurality of message originator formats, based upon knowledge about the error and said message originator, and transmitting a message originator error report to said message originator in said one of said plurality of message originator formats.

8. The method of claim 7, wherein the choosing step comprises the step of further choosing said one of said plurality of message originator formats, based upon an Automatic Number Identification signal received from said message originator.

9. A controller in a fixed portion of a radio messaging system for intelligently generating an error report, the controller comprising:

a network interface for receiving a message;

a processing system coupled to the network interface for processing the message; and an output interface coupled to the processing system for outputting the message, wherein the processing system is programmed to:
store a list of preferred formats corresponding to users of portable subscriber units;
encounter an error that occurs while a message originator attempts to send a message to a message recipient selected from one of said users;
select, in response to said error, one of said preferred formats from said list, based upon knowledge about said error and said message recipient; and
transmit said error report to said message recipient in said one of said preferred formats.

10. The controller of claim 9, wherein the processing system is further programmed to transmit said error report such that said error report is different from another error report originally conveyed by one of said portable subscriber units to said message recipient in response to said error.

11. The controller of claim 9, wherein the processing system is further programmed to transmit to said message recipient said error report such that said error report contains service locations proximate said message recipient, in response to the error resulting from an indication from said message recipient that service is needed.

12. The controller of claim 9, wherein the processing system is further programmed to choose a format defining how said error report is delivered, said format selected from a group of formats consisting of a voice format and a displayed image format that can include any of characters, icons, and numbers.

13. The controller of claim 9, wherein the processing system is further programmed to choose a format defining a content of said error report, said format selected from a group of formats consisting of a brief report and a verbose report.

14. The controller of claim 9, wherein the processing system is further programmed to choose a format defining how said error report is delivered, said format selected from a group of formats consisting of a voice message recorded by the user and a selection of voice messages recorded by others.

15. The controller of claim 9, wherein the processing system is further programmed to:

store a plurality of message originator formats corresponding to the users of the portable subscriber units;

choose one of said plurality of message originator formats, based upon knowledge about the error and said message originator; and transmit a message originator error report to said message originator in said one of said plurality of message originator formats.

16. The controller of claim 15, wherein the processing system is further programmed to choose said one of said plurality of message originator formats, based upon an Automatic Number Identification signal received from said message originator.

* * * * *